March 6, 1934. C. E. WEATHERSTONE 1,950,335
PROTECTIVE DEVICE FOR RISER PIPES AND VALVES THEREON
Original Filed Sept. 22, 1931
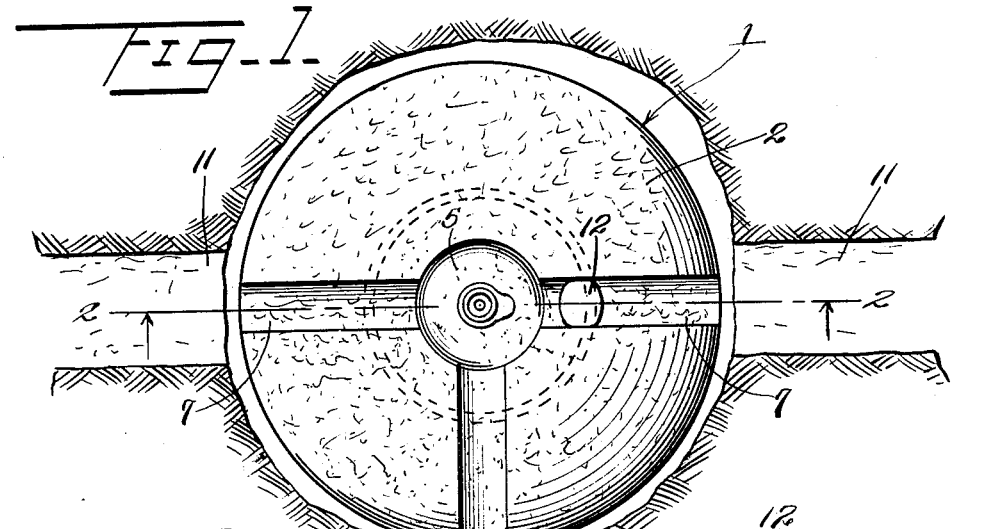
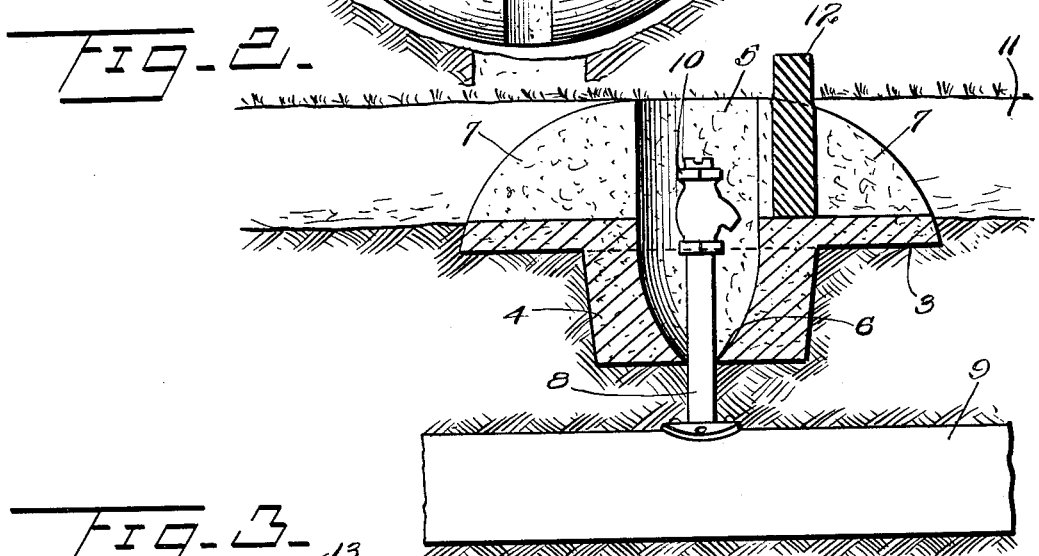
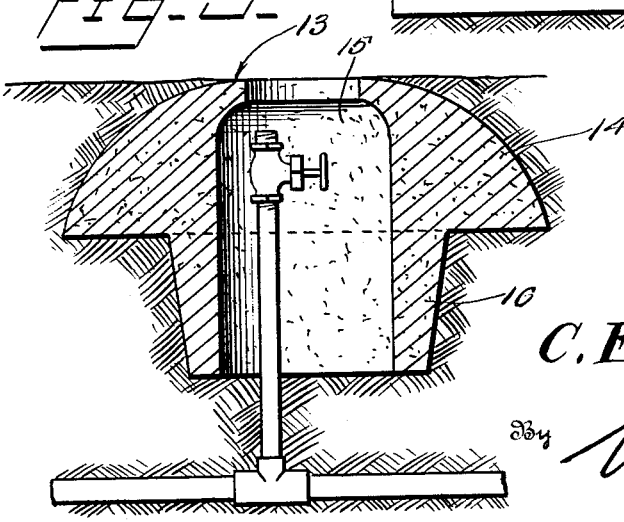
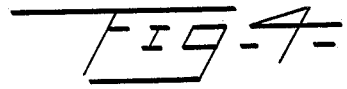
Inventor
C. E. Weatherstone
By Watson E. Coleman
Attorney Patented Mar. 6, 1934

1,950,335

UNITED STATES PATENT OFFICE 1,950,335

PROTECTIVE DEVICE FOR RISER PIPES AND VALVES THEREON

Charles E. Weatherstone, Omak, Wash.

Application September 22, 1931, Serial No. 564,409
Renewed August 8, 1933

9 Claims. (Cl. 61—12)

This invention relates to the class of irrigation and pertains particularly to a guard means for protecting faucets which control the introduction of water into the irrigation ditches.

The primary object of the present invention is to provide a device which is designed to be sunk into the ground and to surround the faucet mounted upon the riser pipe of an irrigation system to prevent animals and vehicles damaging the faucet in passing thereover.

Another object of the invention is to provide a faucet protector of the character described which may also be employed for controlling the flow of water from the faucet into a series of distributing ditches leading therefrom.

A still further object of the invention is to provide a guard device for faucets mounted upon stand pipes which are embedded in the ground, which may be cast in a unit and readily embedded in the ground about the faucet and which is so designed that it will not become displaced so as to fail in the purpose for which it is designed.

Other objects and advantages of the invention will become apparent as the description of the invention proceeds and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in top plan of the device embodying the present invention showing the same in applied position, the earth which would normally overlie the same having been removed;

Figure 2 is a sectional view taken on the line 2—2 of Figure 1;

Figure 3 is a view in transverse section of a slightly modified form of the device as illustrated in Figures 1 and 2;

Figure 4 is a fragmentary view of the preferred form of the device looking down into one of the channels thereof, showing the device employed for closing the channel.

Referring now more particularly to the drawing wherein like numerals of reference indicate corresponding parts throughout the several views, the numeral 1 indicates generally the preferred form of the guard device embodying the present invention. This device is preferably formed of concrete, though, of course, it may be formed of any number of other substances, and as shown consists of a circular dome-shaped solid body 2 having a flat under surface 3 from the center of which there extends downwardly the under body portion 4 which may be of circular or polygonal cross sectional design as desired.

In the central part of the dome-like body 2, or head as it may be called, and the under body 4, there is formed the well 5 which opens at its top through the top of the body 2 and at its lower end is gradually constricted and finally terminates in the small lower end opening 6 which is of approximately the same diameter as a water pipe.

Formed to extend radially about the well 5 are the horizontally disposed channels 7 which open into the well and extend outwardly therefrom through the curved top surface of this body.

In use the entire device is sunk into the ground so that the highest point of the head 2 comes flush with the top of the ground as shown in Figure 2. The device has extended upwardly into the well 5 through the bottom opening 6, a riser pipe 8 of the irrigation system in association with which it is used, which pipe leads from a main water distributing pipe 9. The upper end of the riser pipe 8 has mounted thereon a faucet or cock 10, the outlet of which is directed downwardly so that the water flowing therefrom when the same is opened, will strike into the bottom of the well.

Each of the channels 7 leads, of course, into an irrigation ditch such as indicated by the numeral 11 and when the well 5 has filled to the bottom level of the channel 7 the water will flow therefrom into the ditches which are aligned with the channels.

In order to control the flow of water through the several channels there are provided plug bodies 12 which are of a length greater than the greatest depth of the channels 7 and are preferably of oval cross sectional design as shown in Figure 4. When any of the channels 7 are to be closed so that the water will not flow therethrough from the well into the adjacent ditch, one of these bodies is disposed in vertical position therein in the manner shown in Figures 1 and 2, and turned so as to compress it between the side walls of the channel, the long axis of the oval cross section thereof being greater than the width of the channel so that the body will be firmly compressed in the walls in the manner illustrated in Figure 1.

In Figure 3 there is shown a slightly modified form of the guard device illustrated in Figures 1 and 2. In this form of the device, which is indicated as a whole by the numeral 13 the head 14 does not have channels formed therethrough as in the device 1, but there is formed axially therethrough a well 15 which opens through the top of the head and extends downwardly to and opens through the bottom of the bottom extension 16. This well is of substantially the same diameter throughout except at the very top where it is reduced slightly in the manner shown. This, however, is not absolutely necessary for it will be readily seen that the opening may be made of the same diameter from one end to the other without interfering with the utility of the device.

This form 13 of the faucet guard is provided for the protection of hose connection valves located in lawns, fields, golf links or other places where it might be desirable to attach a hose for the distribution of water over the surrounding territory and the guard acts to protect the valve from damage through the passage of machinery or cattle thereover.

From the foregoing it will be readily appreciated that the present device will constitute a valuable addition to irrigation systems by preventing machinery or cattle from damaging the valves which control the flow of water into the various irrigation ditches and also by preventing the water flowing from the valve from digging into and washing away the earth from around the riser pipe.

By forming the bodies in the manner shown, that is, with a flat bottom surface and an extended central under body portion, the tendency of the body to become displaced or oscillated from horizontal position by the passage of machinery thereover is overcome. The body will thus maintain the horizontal position in which it is placed in the ground and, therefore, the equal distribution of water through the several channels is obtained.

The plug bodies 12 which are employed for closing the channels are formed of any suitable compressible material, rubber being preferable.

Having thus described the invention what is claimed is:—

1. A guard device for a valve carrying riser pipe embedded in the ground, comprising a body having a flat under surface and a rounded top surface and further having an under body extending from the central portion of the bottom surface, and a well formed axially through the body and the under body and opening through the top of the said body, said well being designed to receive the upper part of said riser pipe and the valve carried thereby.

2. An irrigation riser pipe and valve guard, comprising a body designed to be embedded in the earth with the top flush with the top of the earth, a well formed axially through the body for the reception of the said riser pipe, and relatively deep water distributing channels formed in the top of the body radially of the well and opening thereinto.

3. A guard device for the riser pipe of an irrigation system and a valve carried thereby, comprising a body having a dome like top and designed to be embedded in the earth with the highest point of said top flush with the surface of the earth, a well formed axially through the body for the reception of the upper end of said riser pipe and the valve carried thereby, and relatively deep distributing channels formed in the top of the body radially of and in communication with said well.

4. A guard device for the riser pipe of an irrigation system and a valve carried thereby, comprising a body having a rounded top and designed to be embedded in the earth with the highest point of said top flush with the surface of the earth, a well formed axially through the body for the reception of the upper end of said riser pipe and the valve carried thereby, distributing channels formed through the body radially of and in communication with said well, said well being constricted at its lower end to a diameter to snugly receive the riser pipe extending thereinto.

5. An irrigation system riser pipe and valve protecting device comprising a circular body having a rounded dome-like top surface and a flat bottom surface and further having an under body extending downwardly from the central portion of the bottom surface, a well formed axially through the body and the under body for the reception of said riser pipe and valve when the body is embedded in the ground, and radially disposed channels formed through the body and communicating with said well.

6. In a protective device of the character described having a water channel therethrough, means for closing said channel comprising an elongated body of compressible material, of oval cross section, the long axis of the cross sectional design of the body being greater than the width of said channel whereby the body will be compressed between the channel walls when turned in the channel.

7. A guard device for valve carrying riser pipes embedded in the ground, comprising a body having a dome like top surface and a flat bottom surface, the said dome like top rising from the plane of the bottom surface, the body being designed to be embedded in the ground with the highest point of the top surface flush with the surface of the ground, and a well formed axially through the body to receive the upper end of said riser pipe and the valve carried thereby.

8. In combination, a body having a dome-like top with a well formed vertically centrally therein and opening through the top and channels opening through the top and radiating from said well into which they open, and removable means closing one of the channels and comprising an elongated body of resilient compressible material forced into the channel and compressed between the side walls thereof and extending from the bottom to the top of the same.

9. In combination, a body having a dome-like top with a well formed vertically centrally therein and opening through the top and channels opening through the top and radiating from said well into which they open, and an elongated body of a cross sectional outline other than circular disposed vertically within a channel and wedges between the walls thereof, the wedging of the body between the walls being effected by rotating the body about its longitudinal axis after it is placed in the channel.

CHARLES E. WEATHERSTONE.